United States Patent [19]

Taylor

[11] Patent Number: 5,119,933
[45] Date of Patent: Jun. 9, 1992

[54] COMPUTER DISK PACKAGE PROVIDING IN-USE DISPLAY OF PRINTED INFORMATION

[75] Inventor: Lee R. Taylor, Mukwonago, Wis.

[73] Assignee: David L. Hendrickson, Milwaukee, Wis.; a part interest

[21] Appl. No.: 630,525

[22] Filed: Dec. 20, 1990

[51] Int. Cl.⁵ ............................................. B65D 85/57
[52] U.S. Cl. ................................... 206/232; 206/313; 206/444; 206/459
[58] Field of Search ............... 206/232, 312, 313, 444, 206/459; 360/133; 369/75.1, 273, 289, 291

[56] References Cited

U.S. PATENT DOCUMENTS

| | | | |
|---|---|---|---|
| 1,888,313 | 11/1932 | Fiorenza | 206/232 |
| 3,426,960 | 2/1969 | Shore | 206/312 |
| 4,473,153 | 9/1984 | Colangelo | 206/313 |
| 4,828,105 | 5/1989 | Silengo et al. | 206/232 |
| 4,905,831 | 3/1990 | Bagdis et al. | 206/313 |
| 4,996,681 | 2/1991 | Cocco et al. | 369/273 |

FOREIGN PATENT DOCUMENTS 2141998  1/1985  United Kingdom ............... 206/444

*Primary Examiner*—Jimmy G. Foster
*Attorney, Agent, or Firm*—Andrus, Sceales, Starke & Sawall

[57] ABSTRACT

A computer disk sleeve comprised of a semi-rigid envelope-like body, an accordion-folded portion and an adhesive portion for attachment to a computer disk. Upon attachment of the sleeve to the computer disk, the disk and the sleeve comprise an integral package. All elements of the sleeve in conjunction provide amplified areas for printed indicia or other notation. Variations in the folding methods of the accordion-folded portion provide dust protection and provide use as a mailing container.

20 Claims, 4 Drawing Sheets

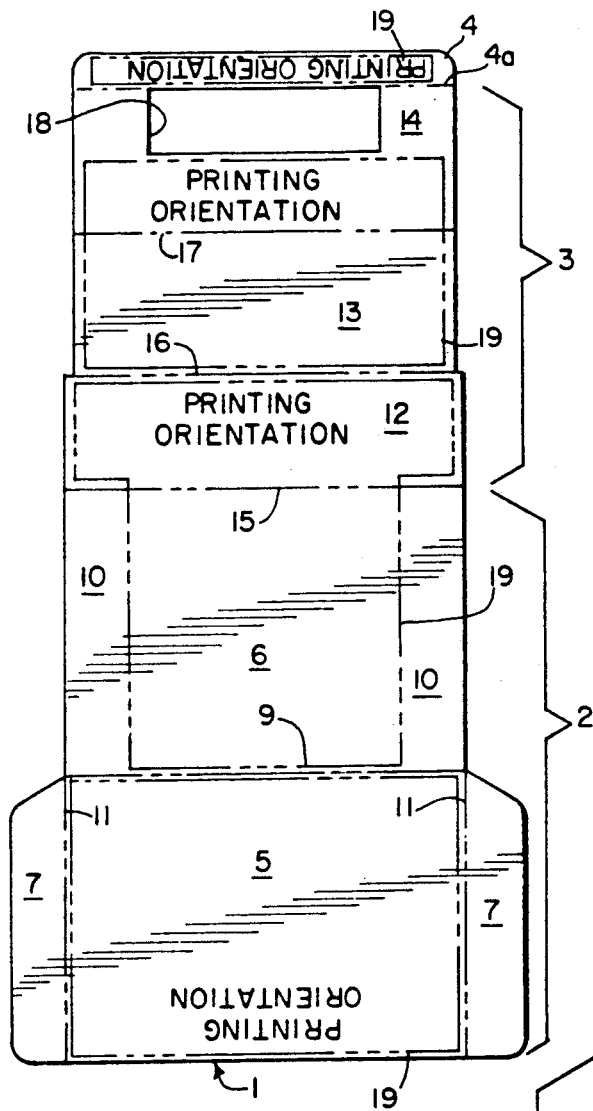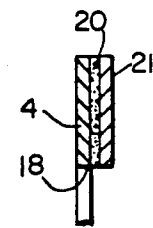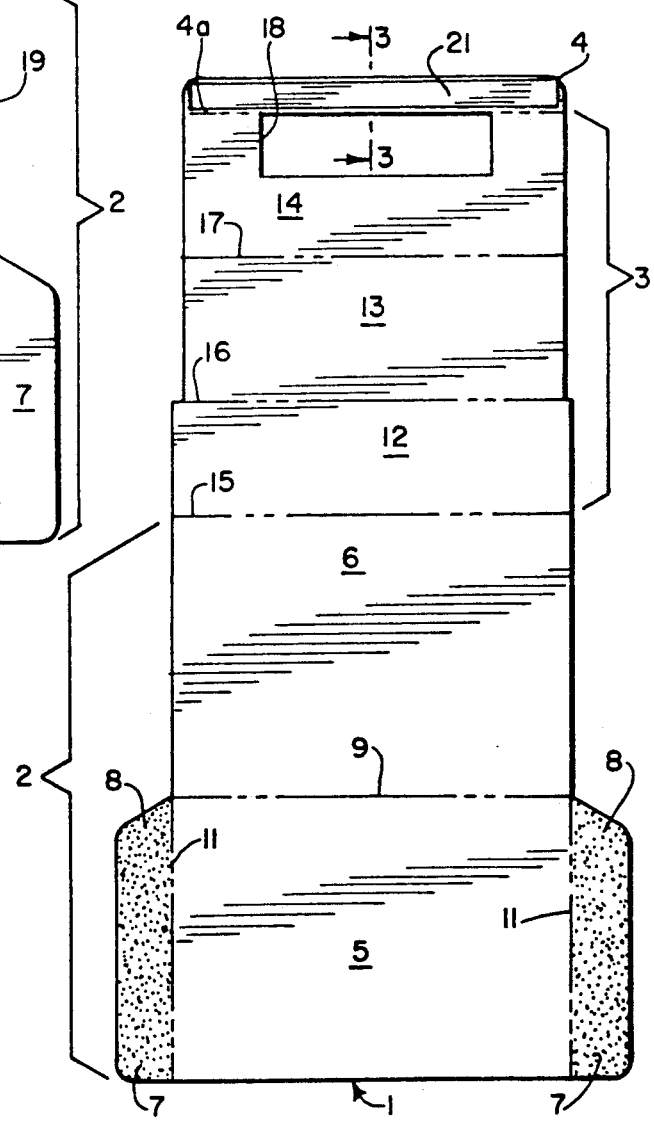
FIG. 1
FIG. 2
FIG. 3

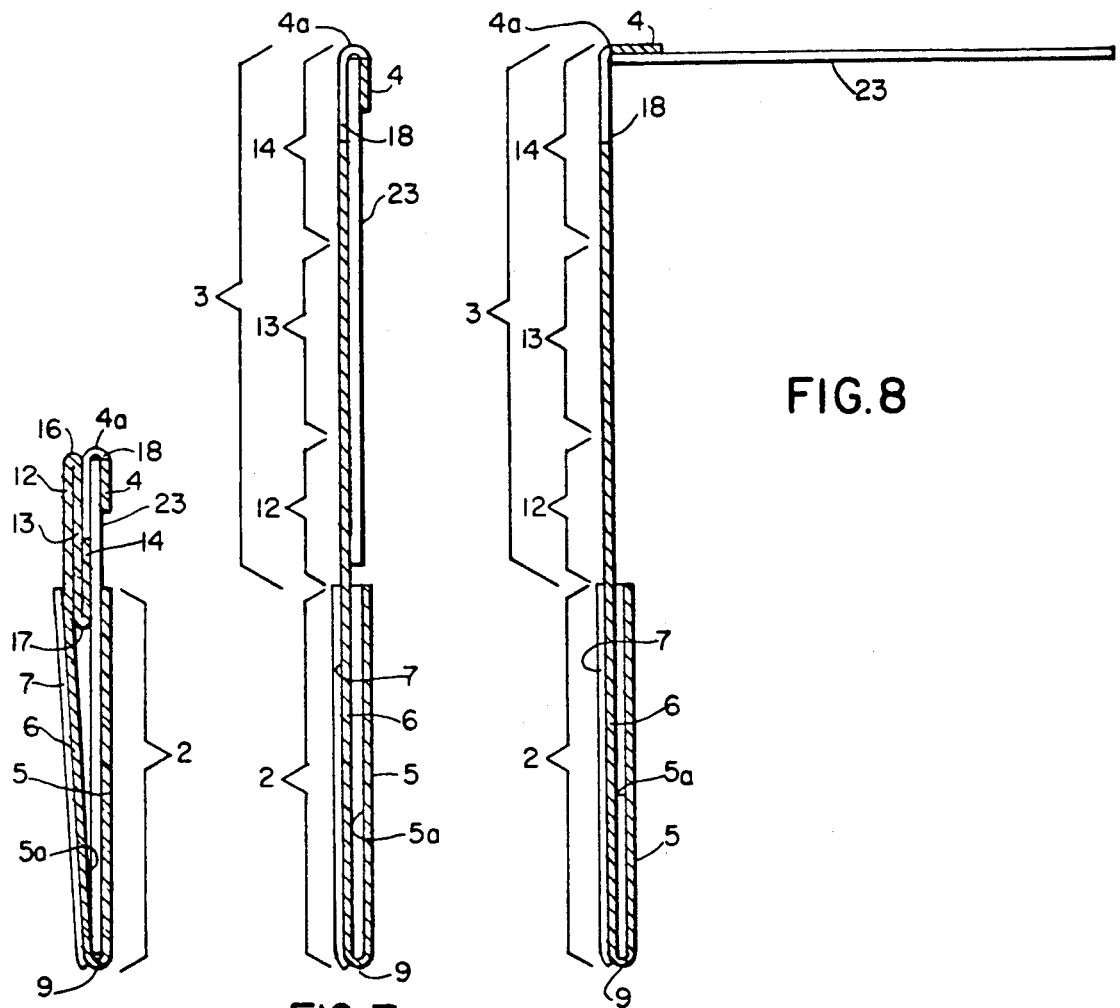

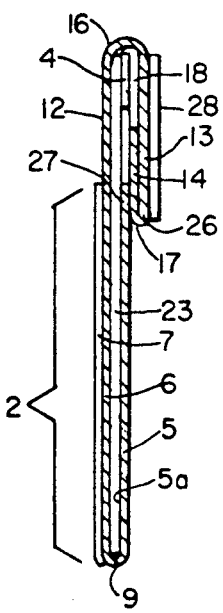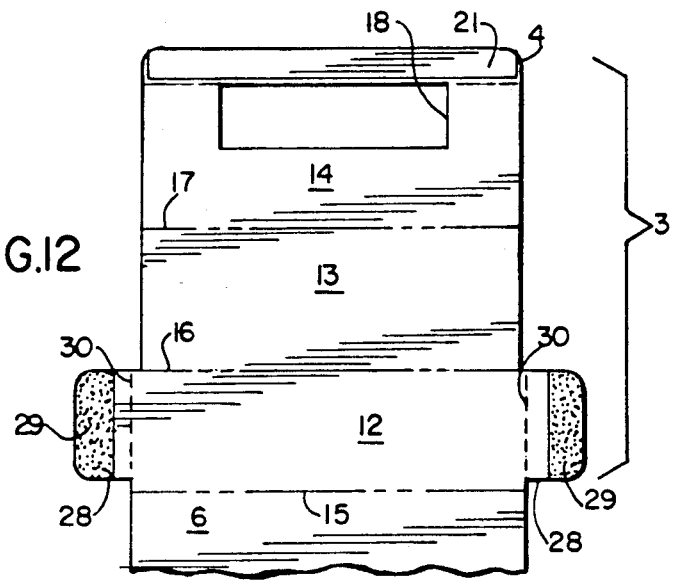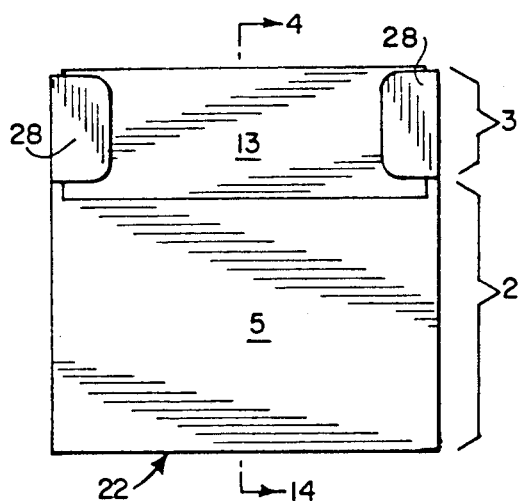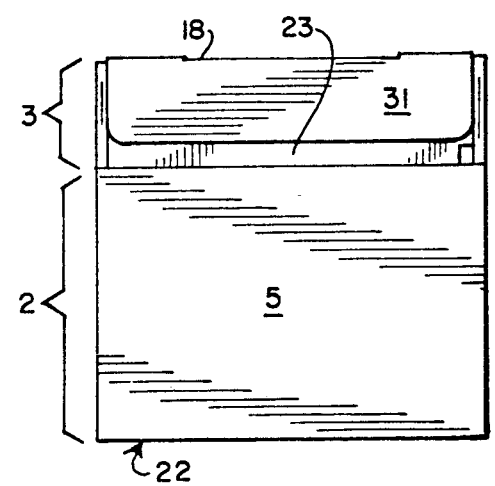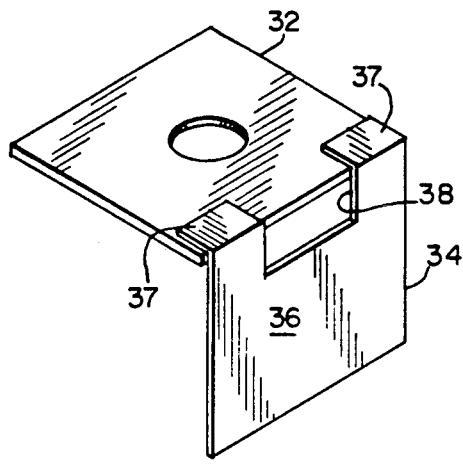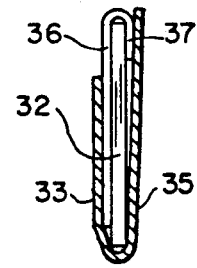

COMPUTER DISK PACKAGE PROVIDING IN-USE DISPLAY OF PRINTED INFORMATION

BACKGROUND OF THE INVENTION

This invention relates generally to computer disks and more specifically to sleeves, envelopes or containers for computer disks. The computer disks referred to herein are the so-called "floppy" disk assemblies, which are manufactured to various standard dimensions. These disk assemblies are commonly comprised of a flexible magnetic disk permanently housed in a flexible or rigid square or rectangular housing. It is this assembly which will be referred to as the disk or "floppy" disk.

The "floppy" disk is customarily packaged in a sleeve similar to the sleeves used to cover and protect a vinyl audio recording. When the disk is dedicated to a specific program, such as a game or word processor or any other program, the purchaser of such a disk customarily receives a package comprising the disk, the sleeve, and an instruction sheet. These three separate units are usually contained in an overall package with advertising graphics and literature and the like. The present invention provides and improvement to the usual combination of disk, sleeve, and instruction sheet.

When using a floppy disk in the abovementioned package configuration it is quite easy for the user to misplace either the sleeve or the instruction sheet or both. When the disk is inserted into the computer disk drive, the instruction sheet and the sleeve must be separated from the disk. During use of the disk, reference to the the instruction sheet may be hindered simply because the instruction sheet can easily be misplaced in or around the work area. Often the sleeve, too, is misplaced. With this system, there is usually not adequate space provided on the sleeve, the instruction sheet or the disk to record written information about the contents of the disk.

Disks that are sold with no specific program, so-called blank disks, may have no instruction sheet but are contained in a conventional sleeve, as mentioned above. Such packages provide very litte space for user notation or indicia on either the disk or the sleeve.

Some disks are permanently contained in a rigid housing. While these disks may be stored without a sleeve, they too do not provide a very large area on their surface for written information.

In order to mail a computer disk it is necessary to provide a separate mailing container.

The present invention overcomes the problems associated with the abovementioned disk packaging.

It is one object of the present invention to provide a disk package wherein the sleeve and the instruction sheet are integral and are permanently or semi-permanently attached to the disk, even when it is placed in a computer disk drive and in in use.

Another object of the present invention is to provide an easy means of reading and accessing instructions for a computer disk.

Another object of the invention is to prevent loss or misplacement of the sleeve and instructions for a computer disk.

Yet another object of the invention is to provide an integral mailer for a computer disk that is permanently housed in a flexible housing.

Yet another object of the invention is to provide an integral dust cover and indicia sheet for a disk that is permanently housed in a rigid housing.

SUMMARY OF THE INVENTION

In accordance with the invention, a device for displaying information pertaining to a computer disk comprises a panel adapted to receive indicia or information pertaining to the disk, attachment means for attaching the panel to the disk housing, and pivotable connection means disposed between the panel and the attachment means for providing pivoting movement of the panel relative to the disk. The panel is disposed against the disk housing when the disk is not in use, and is pivotable away from the housing to allow the disk to be inserted into a disk drive. In one embodiment, an envelope-like body portion is attached to the panel for receiving the disk when it is not in use.

The attachment means preferably comprises an edge portion secured in a temporary or permanent fashion to the disk housing, and the envelope-like portion, and the edge portion, which is attached to the computer disk by an adhesive, are separated by an accordion-fold portion comprised of a plurality of subpanels. The accordion-fold portion has an opening to provide clearance for the disk retaining mechanism on a computer disk drive. The accordion folds reduce the overall area of the sleeve to approximate dimensions of the disk when storing the disk, and provide a larger area for notation or other indicia when the disk is disengaged from the envelope-like body portion, as when the disk is inserted into the disk drive of a computer.

In another embodiment the edge portion has an adhesive strip protected by a tear strip for retro-attachment to a computer disk.

In yet another embodiment the envelope-like body portion is provided with additional adhesive-coated tabs so that by folding the accordion-fold portion over the disk, the adhesive-coated tabs may be folded so as to attach to the accordion-fold portion thereby sealing the disk inside the sleeve so that the sleeve may be used as a integral mailing envelope.

In yet another embodiment, the adhesive-coated edge portion consists of two tabs attached to a flexible or rigid disk assembly.

The invention further contemplates a method of displaying printed information pertaining to the disk while the disk is in use, and to packaging of a computer disk, substantially in accordance with the foregoing summary.

Other objects, features and advantages of the invention will be apparent when the description is considered in conjunction with the accompanying drawings.

BRIEF DESCRIPTION OF THE DRAWINGS

The drawings illustrate the best mode presently contemplated of carrying out the invention.

In the drawings:

FIG. 1 is a top plan view showing the "outside" of the blank of the computer disk sleeve of the invention.

FIG. 2 is a bottom plan view showing the "inside" of the blank of the computer disk sleeve of the invention.

FIG. 3 is a detail cross-sectional view taken along line 3—3 of FIG. 2.

FIG. 6 is a cross-sectional view of the computer disk sleeve of the invention taken along line 6—6 of FIG. 4.

FIG. 7 is a cross-sectional view of the computer disk sleeve of the invention similar to FIG. 6, showing the computer disk withdrawn from the envelope-like body of the sleeve.

FIG. 8 is a cross-sectional view of the computer disk sleeve of the invention similar to FIG. 7, showing the withdrawn computer disk in a position to be inserted into a computer disk drive.

FIG. 10 is cross-sectional view of the computer disk sleeve of the invention somewhat similar to FIG. 6, showing the accordion-fold portion folded in reverse of the folds shown in FIG. 6.

FIG. 11 is a cross-sectional view of the computer disk sleeve of the invention somewhat similar to FIG. 10, showing the accordion fold portion folded so as to provide dust provide dust protection for the computer disk.

FIG. 12 is a partial top plan view of the blank of another embodiment of the computer disk sleeve of the invention.

FIG. 13 is front view of the embodiment of the computer disk sleeve formed from the blank shown in FIG. 12.

FIG. 14 is a cross-sectional view taken along lines 14—14 of FIG. 13.

FIG. 15 is a front view somewhat similar to FIG. 13, showing yet another embodiment of the invention.

FIG. 16 is a perspective view showing yet another embodiment of the invention.

FIG. 17 is a cross-sectional view of the embodiment of the invention shown in FIG. 16.

DETAILED DISCRIPTION OF THE INVENTION

Figure 4:
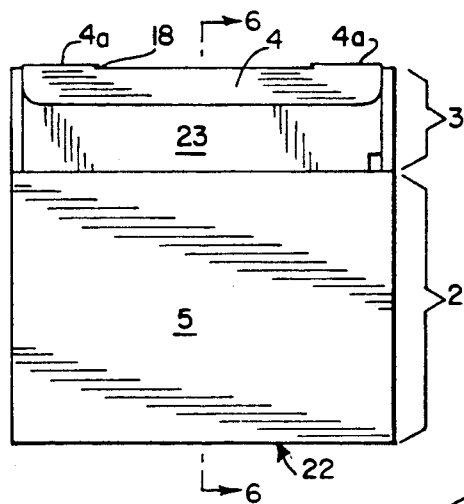
FIG. 4 is a back view of the computer disk sleeve of the invention formed from the blank shown in FIGS. 1 and 2.

Referring to FIGS. 1 and 2, a computer disk sleeve blank 1 is made of paper, paperboard, thin plastic, or the like. Computer disk sleeve blank 1 is comprised of an envelope-like body portion 2, an accordian-fold portion 3 and an adhesive-coated portion 4. Envelope-like body portion 2 is comprised of a front panel 5, a back 16, and a pair of tabs 7. One side of each tab 7 is coated with an adhesive 8. Panels 5 and 6 are brought into proximity with each other by folding along a fold line 9, and each of tabs 7 are secured to areas 10 of panel 6 with adhesive 8 by folding tabs 7 along fold lines 11. These steps of assembly form a pocket 5a(FIGS. 6-8).

Accordion-fold portion 3 is comprised of panels 12, 13 and 14. The accordion folds are accomplished by folding panels 12, 13 and 14 along lines 15, 16 and 17. The exact nature of the folds will become apparent in the description of subsequent FIGS. 6-8.

Panel 14 has an opening 18. Panel is separated from adhesive portion 4 by fold line 4a.

All of the fold lines referred to and shown in blanks 1 may be scored line or printed lines or they may be imaginary lines merely indicating the position of actual folds that are necessary for the construction of the computer disk sleeve.

FIG. 1 also shows areas 19 where printing or other indicia or notation may be applied, and the likely orientation of such indicia.

FIG. 3 is a detail cross-sectional view showing adhesive 20 on tab 4 of the computer disk sleeve. A protective pull strip 21 is provided to protect adhesive 20 until the computer disk sleeve is attached to a computer disk. It is not necessary to provide pull strip 21 in instances where a manufacturer may wish to attach the sleeve directly to the disk during assembly. It may be desirable that attachment of the sleeve to the disk be made with double-sided, or single sided, sticky tape.

Figure 5:
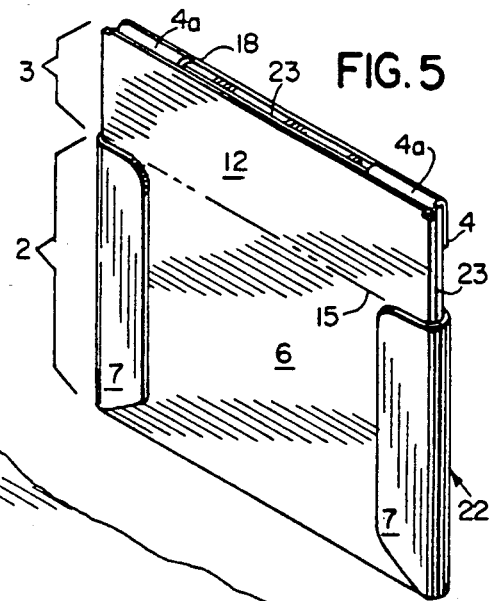
FIG. 5 is a perspective view of the computer disk sleeve contructed according to the invention.

Referring now to FIGS. 4 and 5, 22 is the assembled computer disk sleeve formed from blank 1, containing a computer disk 23. In FIG. 5, panel 12 of the accordion-fold is exposed so that indicia on panel 12 is readable, but panels 13 and 14 are hidden from view. This is shown most clearly in FIG. 6.

FIG. 6 shows a cross-section of the computer disk sleeve 22 in the "closed" configuration, containing a computer disk 23. It can be seen in FIG. 6 that panels 13 and 14 are concealed by panel 12. Panels 5 and 6 and tabs 7 form a pocket 5awhich contains disk 23.

Referring to FIG. 1, panels 13 and 14 have a width less than that of pocket 5a. Further, panels 13 and 14 are substantially shorter in length than either of panels 5 or 6 in combination with panel 12. In this manner, the lower extent of panels 13 and 14 when folded is received within the upper portion of pocket 5a, extending only partially thereinto.

In FIG. 7, computer disk 23 has been removed from pocket 5aof envelope-like portion 2 and accordion-fold panels 12, 13 and 14 have been simultaneously unfolded so that indicia on panels 13 and 14 is readable, as well as indicia on panels 6 and 12. This maneuver is followed by the step shown in FIG. 8, wherein computer disk 23 is positioned for insertion into a computer disk drive 24 (shown in FIG. 9) by unfolding along fold line 4a.

Figure 9:
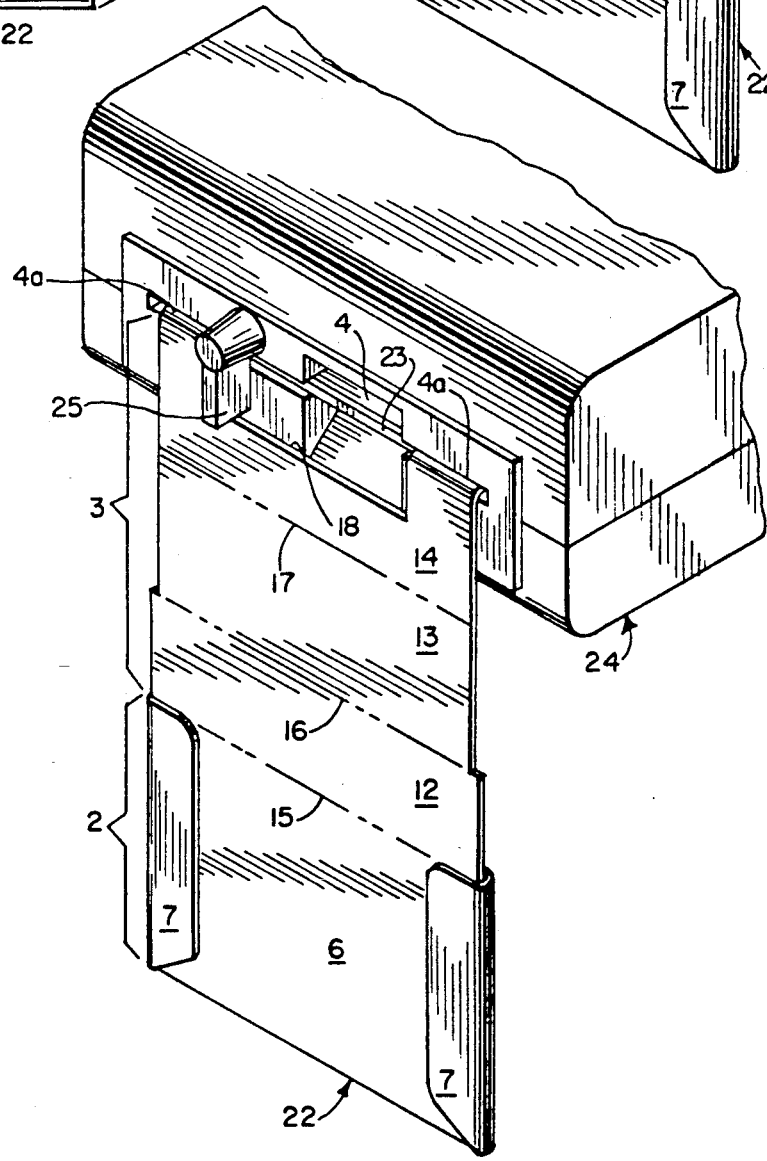
FIG. 9 is perspective view showing the computer disk sleeve of the invention in use with the disk inserted in a computer disk drive.

In FIG. 9, disk drive 24 has a disk retaining lock 25. It can be seen that opening 18 in panel 14 of disk drive sleeve 22 provides clearance for disk retaining lock 25, so that disk retaining lock 25 does not tear mar panel 14 of sleeve 22. Opening 18 is not necessary in all usages, since some computer disk drives do not have a disk retaining means such as lock 25. It can also be seen that panels 6, 12, 13 and 14 disk sleeve 22 are clearly readable when disk 23 is inserted in disk drive 24.

FIG. 10 shows the configuration of accordion-fold panels 12, 13 and 14 when folds 16 and 17 are executed opposite to the way they are executed as in the above description. The accordion-fold panels 12, 13 and 14 may be left in the position shown in FIG. 10 for storage, referring to FIG. 11, fold 16 may be reversed again so as to tuck portion 26 of panels 13 and 14 into the upper portion 27 of panel 5. This configuration forms a closed envelope so as to afford dust protection for disk 23.

FIGS. 12-14 show an embodiment of the invention wherein the sleeve 22 is also usable as a mailer. The method of folding of panels 13 and 14 is identical to that shown in FIGS. 10 and 11, except the portion 26 of panels 13 and 14 is not tucked into upper portion 27 of panel 5. Tabs 28 are added to panel 12. Each of tabs 28 are coated with adhesive 29 so that upon folding of tabs 28, adhesive 29 adheres tabs 28 to panel 13. Perforation lines 30 define tabs 28 separate from panel 12. The mailer may be opened by tearing along perforation lines 30, so that tabs 28 remain adhered to panel 13 but panels 13 and 14 are free to unfold so as to open the mailer.

Alternatively, a tab and slot arrangement could be employed to secure tabs 28 to panel 13.

FIG. 15 shows an adhesive-coated edge portioin 31 that is wider than that shown in FIG. 4. This provides a larger area for adhesion and for indicia.

FIGS. 16 and 17 show a floppy disk assembly with a rigid housing 32.

In this embodiment, a sleeve 33 is comprised of two elements: a bib-like portion 34 and an outer envelope-like sleeve 35. The bib-like portion 34 has panel 36 and an area 37 (in this example, two tabs for adhesion to the disk assembly 32). Panel 36 may be provided with opening 38 for clearance for a disk drive retaining means. This opening is not always necessary since some computer disk drives do not have external disk retaining means.

FIG. 17 shows a typical cross-section of the sleeve assembly 33. It can be seen that the combination of panel 36 and envelope-like portion 35 comprises a jacket for the disk 32 and provides space for readable indicia when the disk 32 is in storage and also when it is installed in a computer disk drive.

While the above description contains many specificities, these should not be construed as limitations on the scope of the invention, but rather as an exemplificaton of some preferred embodiments thereof. Many other variations are possible, for example in materials of construction. The means of assembly of the sleeve may not incorporate adhesive at all, or only in part, and may be effected with a combination of tabs and appropriate slots. Likewise, the mailer embodiment of the invention may incorporate tabs with appropriate slots in lieu of, or in combination with, adhesive. An adhesive may be used that provides only a temporary attachment of the elements to be attached. Printing or indica or any other graphics may be applied to both sides of the accordion-fold portions as well as to be one side as shown and described. Folds for dust protection and/or use as a mailer may be executed differently without violating the spirit of the invention. A folded-over portion may be tucked into an envelope portion for use as a mailer. Folds may be perforated so as to provide ease of separating of the various panels and envelope portion if so desired. The entire sleeve may be separated from the disk by either using semi-permanent adhesive or by using sticky tape to adhere the sleeve to the disk, or perforations may be provided to separate the sleeve from the disk while the attachment portion of the sleeve remains attached to the disk. The proportion of all the elements of the computer disk sleeve may vary according to the different dimensions of computer disk assemblies and according to arbitrary parameters that may not even be known at this time. The sleeve may be constructed integrally, from one blank, with the housing for the disk itself. The sleeve assembly may be used to contain substantially flat objects other than computer disks. Accordingly, the scope of the invention should be determined not by the embodiments illustrated, but by the appended claims and their legal equivalents.

I claim:

1. A computer disk arrangement comprising in combination:

a computer disk contained within a protective housing; and an arrangement for conveying information pertaining to the computer disk, comprising:

a panel adapted to receive indicia pertaining to the disk;

attachment means attaching the panel to the disk housing; and pivotable connection means disposed between the panel and the attachment means for providing pivoting movement of the panel relative to the disk, wherein the panel is disposed against the housing when the disk is not in use and is movable away from the housing so as not to interfere with insertion of the disk into a disk drive.

2. The arrangement of claim 1, wherein the pivotable connection means comprises a hinge connection between the panel and the attachment means.

3. The arrangement of claim 2, wherein the attachment means comprises an attachment portion extending from the panel with the hinge connection disposed therebetween.

4. The arrangement of claim 3, further comprising an adhesive applied to the attachment portion for securing the attachment portion to the disk housing.

5. The arrangement of claim 1, further comprising an envelope-like portion for receiving the disk and housing when the disk is not in use.

6. The arrangement of claim 5, wherein in a portion of the panel spaced from the pivotable connection means is pivotably connected to the envelope-like portion by means of a hinge connection therebetween.

7. The arrangement of claim 6, wherein the envelope-like portion is formed by a front panel and a rear panel, and wherein the hinge connection is provided between the first-mentioned panel and one of the front and rear panels.

8. The arrangement of claim 7, wherein the first mentioned panel, the front panel and the rear panel are formed from an integral blank.

9. The arrangement of claim 7, wherein the front and rear panels are joined at the lower ends, and further comprising securing means for connecting the side portions of the front and rear panels together, to form the envelope-like portion.

10. The arrangement of claim 9, wherein the securing means comprises a part of tabs formed integrally with one of the front and rear panels and being bent into engagement with the other of the panels and secured thereto.

11. The arrangement of claim 6, wherein the panel comprises a pair of hinged accordion-fold subpanels, one of which is pivotable connected to the pivotably connection means and the other of which is pivotably connected to the envelope-like portion.

12. The arrangement of claim 11, wherein, when the disk is placed into the envelope-like portion, the accordion-fold subpanels are folded over the top of the disk housing toward the rear panel of the envelope-like portion to expose a portion of the disk housing above the front panel of the envelope-like portion.

13. The arrangement of claim 11, wherein, when the disk is placed into the envelope-like portion, the accordion-fold subpanels are folded over the top of the disk housing toward the front panel of the envelope-like portion wherein the lower end of the accordion-fold subpanels overlap the upper end of the front panel of the envelope-like portion, wherein the front and back of the disk are completely enveloped by the front and rear panels of the envelope-like portion in combination with the accordion-fold subpanels.

14. The arrangement of claim 13, further comprising tab means for maintaining the accordion-fold subpanels against the front of the disk housing and against the front panel of the envelope-like portion, to form a mailer package for the disk and its housing.

15. Package for displaying information pertaining to a computer disk contained within a protective housing, comprising:
- a panel adapted to receive indicia pertaining to the disk;
- attachment means for attaching the panel to the disk housing; and
- pivotable connection means comprising a hinge connection disposed between the panel and the attachment means defining a pivot axis for providing pivoting movement of the panel relative to the disk wherein the panel is disposed against the housing when the disk is not in use and is movable away from the housing so as not to inferfere with insertion of the disk into a disk drive;
- wherein the disk is insertable into a disk drive having external retaining means for retaining the disk in the drive, and wherein the panel includes an opening for receiving the retaining means so as to prevent interference of the panel with the retaining means, and wherein at least a portion of the panel opening is co-extensive with pivot axis defined by the hinge connection.

16. A sleeved disk assembly, comprising:
- a disk within a protective housing;
- a sleeve, comprising:
- a front panel;
- a back panel;
- said front and back panels being joined together to form a pocket, receiving the protective housing and disk;
- connector means for connecting one of the panels to said protective housing; and
- means interposed between the connector means and the panel connected to the protective housing, for providing withdrawal of the protective housing and disk from the pocket and insertion of the protective housing and disk into the pocket while maintaining connection of the protective housing to the panel.

17. The sleeve disk assembly of claim 16, wherein the means interposed between the connector means and the panel comprises accordion-fold subpanels interconnected between the panel and the connector means.

18. The sleeved disk assembly of claim 17, wherein the connector means comprises a connector panel provided at the outer end of the accordion-fold subpanels and secured to the protective housing.

19. A package for a computer disk contained within a protective housing, comprising:
- a pocket defined by a pair of panels and having a width sufficient to receive the disk therein; and
- a pair of foldable panels connected one to the disk housing and the other to the pocket, the foldable panels being unfolded to allow withdrawal of the disk from the pocket and being folded to allow insertion of the disk into the pocket, wherein the foldable panels have a width less than the width of the pocket for being at least partially received within the pocket when the panels are folded and the disk is inserted into the pocket.

20. A package for a computer disk contained within a protective housing, comprising:
- a pocket formed from an elongated blank having a front panel and a back panel, the front and back panels being joined together to define an internal cavity adapted to receive the disk; and
- a pair of foldable panels connected one to the disk housing and the other to the back panel, the foldable panels each having a dimension along the length direction of the blank less than the dimension of the front panel along the length direction of the blank, wherein the foldable panels are only partially received in the pocket when the disk is received therein.

* * * * *